C. ELLIS.
EDIBLE FAT AND PROCESS OF MAKING SAME.
APPLICATION FILED APR. 16, 1917.
1,390,690.
Patented Sept. 13, 1921.
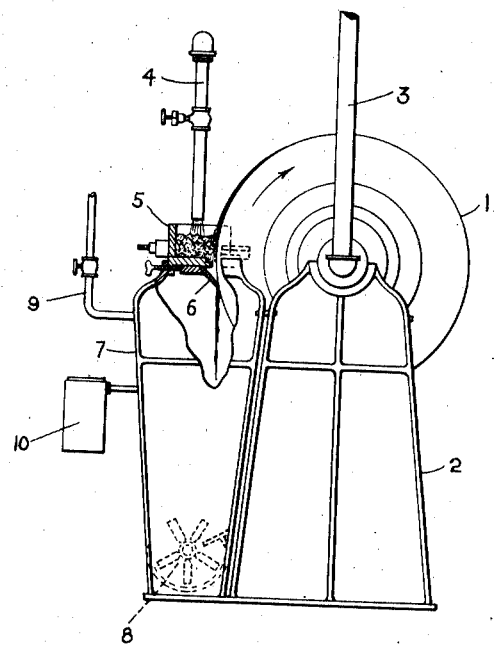

UNITED STATES PATENT OFFICE.

CARLETON ELLIS, OF MONTCLAIR, NEW JERSEY.

EDIBLE FAT AND PROCESS OF MAKING SAME.

1,390,690.  Specification of Letters Patent.  Patented Sept. 13, 1921.

Application filed April 16, 1917. Serial No. 162,347.

*To all whom it may concern:*

Be it known that I, CARLETON ELLIS, a citizen of the United States, and a resident of Montclair, in the county of Essex and State of New Jersey, have invented certain new and useful Improvements in Edible Fats and Processes of Making Same, of which the following is a specification.

This invention relates to edible fat compounds of the nature of lard and lard compounds and substitutes or analogous edible fats of semi-solid consistency and relates particularly to an improvement in the process of incorporating gases with such fatty material and to the product of such process.

In the preparation of edible fat compounds, particularly lard compound, it is customary to pass the molten mixture of fat over a chill roll and then into a beating apparatus, known as a picker trough, in which the fat is agitated with air to produce opacity and whitening of the product by incorporation of fine particles of air throughout the mass. When the endeavor is made to whiten the lard compound to a high degree by incorporating a large amount of air, the fatty material often becomes rancid in a short time, due to the oxidation which takes place from the air in such intimate contact with the fatty material.

Rancidity is usually brought about by the action of air and moisture.

The cause of rancidity in vegetable oils is usually attributed to the formation of relatively small amounts of foreign bodies, such as aldehydes, and the like, which in minute amount change the odor and flavor of the fat from a wholesome edible product to one which is objectionable to eat.

By the old method of aerating lard compounds, considerable quantities of moisture oftentimes are introduced, as air varies in moisture content from day to day and usually no care is taken to dry the air which is incorporated with the lard compound.

By replacing the air by carbon dioxid or similar inert gas, very satisfactory results are obtained, as regards permanent opacity, and the fat does not quickly turn rancid because of the presence of excessive amounts of oxygen. Because of the sluggishness of diffusion of carbon dioxid the particles of this gas appear to remain better vesiculated or distributed through the fat than is the case with gas of higher diffusive properties. Other gases which are inert, especially hydrogen or nitrogen, may be used, but carbon dioxid, as above stated, is the preferred gas used for incorporating into the fatty material in accordance with the present invention.

The inert gas employed may be dried before use or contain a minimum amount of moisture, or in any event, should be of uniform low moisture content in the preferred form of the invention so that no irregularities in the amount of moisture result by its use.

In incorporating the carbon dioxid or similar sluggishly-diffusing inert gas with the fatty material, the whole apparatus, that is to say, the lard chill roll and picker trough, may be inclosed in a housing or chamber into which the carbon dioxid is introduced. Since, however, such arrangement renders the chill roll not readily accessible to adjustment, it is better to apply the gas to the composition during the period of agitation in the picker trough. For this purpose, the picker trough which is often of open construction, may in the present case be closed, or it may be deepened by extending the walls for a considerable distance above the agitating blades, so as to produce a deep well at the bottom of which the lard material is agitated. The carbon dioxid is allowed to flow into this well, and being heavier than air, it collects at the bottom to form a blanket over the fat, being absorbed by the latter as required. The gas is allowed to flow in at such a rate that the well may be maintained say, one-half full of the carbon dioxid gas, or at any rate, preferably a layer of this gas of sufficient depth to cover and blanket the fat and agitating blades and to be of sufficient height above the upmost points reached by the agitator blades that the movement of the agitator does not cause such an eddying of the gas as to draw in material amounts of oxygen which would be incorporated with the fat. Thus the fat is exposed to an excess of carbon dioxid and is readily saturated with the gas, while an additional quantity of gas is entrained to produce the vesiculation and distribution referred to above.

Various types of indicators may be used to show the height of the carbon dioxid in the picker trough, as, for example, a float, or other apparatus, based on the relatively high specific gravity of carbon dioxid, or some chemical indicator, or any other suitable device may be employed. In the usual type of chill roll, it is customary to arrange to have the lard composition leaving the chill roll fall directly into the picker trough and this type of construction may be employed in making apparatus suitable for carrying out the present invention, the picker trough being suitably deepened to allow of the production of the blanket of carbon dioxid as indicated. When however, it is desired to have the picker trough closed, the lard compound may be collected and carried to one end of the picker trough, being passed therethrough in contact with the carbon dioxid. In handling the lard compound for the purpose of transferring from the chill roll to the picker trough, as much care as possible should be taken to avoid incorporating air, although in some cases a small amount of air will do no harm, especially provided the major portion of the gas is carbon dioxid and I do not wish to limit myself by any of the foregoing statements to the exclusive use for aeration of an inert gas as mixtures of inert gases with ordinary air may be used so as to reduce the proportion of oxygen in air to a degree below which no serious rancidification of the oil or fat will take place.

In the removal of the lard compound from the picker trough, some arrangement may be used such as a trap or vertical pipe, through which the lard compound is caused to pass, which serves as a trap to carbon dioxid and prevents the gas from flowing out of the bottom of the apparatus through the exit for the lard compound or lard material.

The carbon dioxid employed may be derived from ordinary liquid carbon dioxid which is free from moisture and this anhydrous gas may be used in place of moist carbon dioxid. The carbon dioxid made by wet methods may if desired, be dried to a uniform moisture content but this is not necessary in all cases.

The fatty oil may be improved in permanent qualities by taking care to expel all the moisture contained therein prior to exposing the composition to the chilling action of the chill roll and such dry fat in conjunction with the use of a dry gas enables the production of a lard compound of excellent color which may be shipped to hot countries in closed containers and may be preserved indefinitely in warm climates without that deterioration which is usually quite promptly noticed in many of the lard products made by agitation of the fat in ordinary air.

The subject matter of incorporating an inert gas such as hydrogen or nitrogen, into edible fatty material of lard-like consistency as herein described and claimed, is continued from my co-pending application 808,461, filed December 23, 1913 (renewal 276,869, filed February 13, 1919).

In the accompanying diagrammatic drawing an end elevation is shown of apparatus adapted for carrying out the present process. That portion of the apparatus depicting the oil feed is shown in section. In the drawing 1 is a hollow roll supported on the base 2. The roll is supplied with brine through the pipe 3 so that the surface of the roll is kept chilled. 4 is a pipe through which the molten lard compound or other fat is conveyed to the apparatus. 5 is a trough into which the fat discharges from the pipe 4 and is distributed by means of the trough 5 onto the surface of the chilled roll 1. 6 is a scraper for the removal of the chilled fat. 7 is a gas chamber situated beneath the scraper and while not necessarily gas-tight is closely fitted about the trough 5 and chill-roll in the manner shown so as to allow for as little leakage and distribution of gas as is possible, consistent with the nature of the operation involved. 8 is a paddle or series of blades or agitators situated in the bottom of the trough of the gas chamber 7 by means of which the plastic fat is thoroughly agitated and beaten up with the surrounding gas. 9 is an inlet pipe for the carbon dioxid, nitrogen or other gas employed. 10 is a small container connecting with the gas chamber 7 and is used for testing the quality of the gas. For example in the case of carbon dioxid tests based on the specific gravity thereof may be employed.

In the operation of the processes involving the above described apparatus molten fat such as lard compound is fed into the trough 5 by means of the feed pipe 4. The liquid fat distributes itself along the trough 5 which is of a length corresponding to the length of the chill roll 1, and the fat thereby comes in contact with chill roll. The latter is maintained in rotation and a thin layer of the fat is carried upwardly and around on the surface of the roll, becoming chilled and solidified to a plastic condition. It is removed by the scraper 6, falling into the gas chamber 7 where it is beaten up with the carbon dioxid or nitrogen, introduced by the pipe 9. The motion of the blades in the picker trough of the gas chamber 7 causes the lard compound to be moved to one end thereof where the fat is discharged into any suitable receptable. As a rule it is pumped into containers by means of a plunger pump, or similar suitable device. Thus the solid fat employed is first melted, then suddenly chilled and while in a semi-solid or plastic state is brought into contact with a gas such as carbon dioxid or nitrogen or similar inert gas and is agitated to yield a whitened product. In order to secure this whitened product it is requisite that a liberal quantity, preferably an excess of the gas, be employed so that the fat is not only saturated therewith but contains gas in the form of fine globules or vesiculations distributed throughout its mass. The latter causes the whitened appearance of the fat. If a sufficient amount of gas is not present to saturate the fat and provide an excess distributed through the mass in an undissolved state the fat will not be properly whitened. Consequently the operator may regulate the operation to introduce the amount of gas required by inspecting the color of the product issuing from the apparatus.

What I claim is:—

1. A process which comprises incorporating an inert gas into a soft edible fatty material of about a lard-like to butter-like consistency, until a vesiculated product containing such fatty material and incorporated inert gas disseminated therethrough, is produced.

2. Soft edible fat, of a semi-solid consistency at normal room temperature, carrying vesiculated inert gas distributed throughout the body thereof.

3. Soft edible fatty material of substantially lard-like to butter-like consistency carrying vesiculated carbon dioxid.

4. A process which comprises vesiculating semi-solid edible fatty material with carbon dioxid.

5. A process which comprises incorporating a dried inert gas into a soft edible fatty material of about a lard-like to butter-like consistency, until a vesiculated product containing such fatty material and incorporated inert gas disseminated therethrough, is produced.

CARLETON ELLIS.